United States Patent
Klingler et al.

(10) Patent No.: US 9,093,877 B2
(45) Date of Patent: Jul. 28, 2015

(54) ADJUSTMENT DRIVE

(71) Applicant: Brose Fahrzeugteile GmbH & Co. KG, Wuerzburg, Wuerzburg (DE)

(72) Inventors: Peter Klingler, Neubrunn (DE); Andreas Schweichart, Veitshoechheim (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 89 days.

(21) Appl. No.: 13/849,991

(22) Filed: Mar. 25, 2013

(65) Prior Publication Data

US 2013/0293044 A1   Nov. 7, 2013

(30) Foreign Application Priority Data

Mar. 24, 2012   (DE) .......................... 10 2012 006 008

(51) Int. Cl.
*H02K 5/14* (2006.01)
*H01R 39/38* (2006.01)
*H02K 5/22* (2006.01)

(52) U.S. Cl.
CPC ................ *H02K 5/225* (2013.01); *H02K 5/148* (2013.01); *Y02E 10/725* (2013.01)

(58) Field of Classification Search
USPC .................................................... 310/71, 239
IPC .................................... H02K 5/14; H01R 39/18
See application file for complete search history.

(56) References Cited

U.S. PATENT DOCUMENTS

| | | | |
|---|---|---|---|
| 4,749,899 A | | 6/1988 | Ishizawa et al. |
| 5,952,763 A | * | 9/1999 | Bruhn ........................... 310/238 |
| 6,906,438 B2 | * | 6/2005 | Ursel et al. ...................... 310/89 |
| 7,834,497 B2 | * | 11/2010 | Utsunomiya et al. ........... 310/71 |
| 7,928,628 B2 | * | 4/2011 | Honda et al. .................. 310/239 |
| 8,536,746 B2 | | 9/2013 | Kuhnen et al. |
| 2008/0084129 A1 | | 4/2008 | Utsunomiya et al. |
| 2009/0121578 A1 | | 5/2009 | Benkert |
| 2013/0293044 A1 | | 11/2013 | Klingler et al. |

FOREIGN PATENT DOCUMENTS

| | | |
|---|---|---|
| CN | 86 1 08476 A | 7/1987 |
| CN | 1608339 A | 4/2005 |
| CN | 203008623 U | 6/2013 |
| DE | 38 27 886 C1 | 9/1989 |
| DE | 196 21 125 A1 | 11/1997 |
| DE | 20 2009 008 646 U1 | 12/2010 |

OTHER PUBLICATIONS

Chinese Office Action for Chinese Application No. 201210288654.X dated Jan. 29, 2015 with English translation.

* cited by examiner

*Primary Examiner* — Dang Le
(74) *Attorney, Agent, or Firm* — Muncy, Geissler, Olds & Lowe, P.C.

(57) ABSTRACT

An adjustment drive, in particular a window winder drive of a motor vehicle. The adjustment drive has an electric motor with a brush system, the respective brush of the brush system being connected to a plug contact in order to supply power to the electric motor, and an electronics system housing in which a mating contact, with which the plug contact makes contact, is arranged. In this case, the plug contact is mounted such that it can move in the plug-contact-making direction.

13 Claims, 6 Drawing Sheets

ADJUSTMENT DRIVE

This nonprovisional application claims priority under 35 U.S.C. §119(a) to German Patent Application No. DE 10 2012 006 008.4, which was filed in Germany on Mar. 24, 2012, and which is herein incorporated by reference.

BACKGROUND OF THE INVENTION

1. Field of the Invention

The present invention relates to an adjustment drive, in particular a window winder drive of a motor vehicle, having an electric motor with a brush system.

2. Description of the Background Art

Motor vehicles usually have adjustment parts, for example side windows and/or a sliding roof, which can be opened or closed by means of an electromotive adjustment drive. The respective adjustment part is mounted on the motor shaft by means of a gear mechanism which is driven by an electric motor, in particular a worm gear mechanism having an (output-drive-side) worm gear and a (drive-side) worm. The gear mechanism is conventionally arranged in a gear mechanism housing to which the electric motor is attached, for example by means of a holder. The electric motor is usually attached to the gear mechanism housing at its end side, wherein an axial pin, that is to say that region of the motor shaft with which the gear mechanism engages or the gear mechanism drive part (shaft-end-side worm) of the electric motor, is situated within the gear mechanism housing.

Plug contacts which are electrically connected to corresponding mating contacts, which are arranged in the gear mechanism housing, are additionally located at the end side of the electric motor. The plug contacts are arranged in an interlocking manner in a main body of the electric motor, which main body is conventionally produced from plastic, and are secured against slipping or sliding by means of structures. In a known embodiment, the structures of the plug contacts are in the form of saw teeth or fir trees and, by means of the teeth which act as barbs, prevent displacement of the plug contacts both during assembly and during operation of the drive. During production of the electric motor, the plug contacts are encapsulated with the plastic of the main body and therefore the interlocking connection between said plug contacts and main body is established.

An electronics system which is usually arranged in the gear mechanism housing makes electrical contact with the mating contacts. In this case, the electronics system controls a flow of electrical energy via the mating contacts to the electric motor. Furthermore, the electronics system usually has a trapping prevention means for preventing trapping situations during operation of the adjustment drive.

U.S. 2009/0121578 A1 discloses an adjustment drive having a worm gear mechanism and having an electric motor with brushes. The brush system has a contact for electrical connection in the form of a press fit or a close fit, wherein the contact is mechanically uncoupled from the gear mechanism housing in order to prevent vibrations.

SUMMARY OF THE INVENTION

It is therefore an object of the present invention to provide an adjustment drive which is comparatively simple particularly even in respect of plug contact-connection and can be assembled in a reliable manner.

The adjustment drive of a motor vehicle comprises an electric motor and an electronics system housing and is used, in particular, to move an adjustment part, for example a window pane. A mating contact which makes electrical contact with, for example, an electronics system is arranged in or on the electronics system housing. The mating contact is in electrical contact with a plug contact of the electric motor which is arranged, for example, at the end side of said electric motor. The plug contact is used to supply power to the electric motor. To this end, the plug contact is directly or indirectly electrically connected to in each case one brush of a brush system of the electric motor. The electric motor is therefore a commutator motor and power is supplied via a plug contact which is connected to the mating contact of the electronics system housing.

By way of example, the plug contact can be plugged into the mating contact. Expediently, both mechanical and electrical contact is established between the two contacts in this way, where advantageously no other auxiliary means are used. In particular, the two contacts are not welded or soldered, this facilitating assembly of the adjustment drive.

The plug contact is mounted such that it can move in the plug-contact-making direction, that is to say in the direction of the mating contact or in that direction in which the plug contact is moved, in order to establish the electrical contact between the mating contact and the plug contact. In other words, the bearing of the plug contact is designed as a sliding bearing, and the plug contact has position compensation in the plug-contact direction. In particular, position compensation by means of moveable mounting is provided only in the longitudinal direction toward the mating contact or in the direction in which contact is made.

On account of the ability of the plug contact to move, secure electrical contact between the plug contact and the mating contact is also provided during operation. The contact between the plug contact and the mating contact is not broken even when the drive is shaken and the electric motor moves relative to the electronics system housing, and therefore the drive can be reliably operated even under unfavorable conditions. Furthermore, none of the contacts move relative to the other, this firstly protecting the contacts in the region of the mechanical coupling and secondly preventing what is known as contact corrosion which could lead to total breakdown of the drive.

The plug contact is arranged in a contour of the main body of the brush system and is routed by it. In this case, the contour extends in the plug-contact direction. The contour allows the plug contact to move in the plug-contact direction and prevents movement in any other direction. As a result, the ability of the plug contact to move is realized in a comparatively simple manner, wherein a substantially defined position of the plug contact is additionally provided. The plug contact is therefore arranged by means of the contour in such a way that the mating contact makes electrical contact with it during assembly, without additional measures having to be taken. Consequently, the drive can be assembled in a comparatively simple, reliable and time-saving manner.

The plug contact is expediently mechanically connected to the mating contact in an interlocking and/or force-fitting manner. In this way, the plug contact substantially directly follows the movements of the mating contact, this additionally preventing movements between the two. Similarly, the electrical contact between the two is increased in this way, and therefore the electrical resistance is comparatively low. In addition, loosening of the two contacts from one another and the possible subsequent formation of a fault arc between the two contacts is prevented, this preventing increased thermal loading of the drive and consequently possible destruction of said drive.

The plug contact can be designed so as to yield perpendicular to the plug-contact direction. In this case, deformation of this kind of the plug contact can be both elastic and inelastic. In other words, the plug contact is pliant perpendicular to the plug-contact-making direction. In this way, electrical contact between the plug contact and the mating contact is maintained when the electric motor moves perpendicular to the plug-contact-making direction in relation to the electronics system housing. Consequently, the formation of contact corrosion between the two contacts is also prevented in such a case, and therefore the drive can be operated comparatively reliably.

The plug contact expediently has at least one stop element. In particular, the plug contact comprises two stop elements of this kind, said stop element or elements running perpendicular to the plug-contact-making direction and being fitted to the plug contact in the edge region of the plug contact. The stop element is preferably arranged on that side of the plug contact which is averted from the mating contact or is at least offset in this direction. The movement distance of the plug contact is limited by means of the stop element. The stop element preferably stops against a corresponding stop point of the electric motor, in particular against a specific section of the contour, for this purpose.

The movement distance of the plug contact is, for example, limited to less than 1 mm, in particular less than 0.5 mm, consequently is less than 1 mm or 0.5 mm. Position compensation of this kind allows the drive to be assembled in a comparatively simple and time-efficient manner since, as part of a plugging movement of the electric motor to the electronics system housing, the plug contact engages in the mating plug and cannot be moved away from it or can be moved away from it at least only to a comparatively small extent.

Furthermore, the contact between the plug contact and the brush is subjected to comparatively low loading, this leading to a reduced overall size of the brush system. The brush is, for example, connected to the plug contact by means of a braided wire which therefore only has to have or has to compensate for or absorb play of below 1 mm. In spite of the movement distance which is limited to below 1 mm, micro movements between the contacts are nevertheless avoided during operation of the drive, wherein secure connection of the two contacts is achieved during assembly.

The plug contact is particularly preferably in the form of a blade contact and the mating contact is in the form of a forked contact which corresponds to said blade contact. In this case, a blade contact is understood to mean a substantially plate- or strip-like metal contact which extends, in particular, in the plug-contact-making direction. The forked contact is, for example, likewise of plate- or strip-like design and has a slot which expediently runs in the plug-contact-making direction, wherein the two limbs which are formed in this way form the forked contact.

In the assembled state, the blade contact is arranged within the slot of the forked contact and is held between the two limbs of said forked contact. To this end, said limbs rest directly or indirectly on the blade contact. The planes within which the two contacts are substantially located are preferably perpendicular to one another and parallel to the plug-contact-making direction.

A plug connection of this kind firstly allows a mechanical connection between the two contacts which is comparatively simple to establish, wherein said connection can be released likewise comparatively quickly. Secondly, this type of connection is comparatively cost-effective and can be established with comparatively large manufacturing tolerances. Furthermore, a force-fitting connection between the two contacts can be established by means of the blade- and forked-contact system in a comparatively simple manner, with the result that the plug contact substantially follows the movements of the mating contact. Furthermore, no auxiliary means, such as screws or the like, are required to establish the contact between the plug contact and the mating contact in this case.

The plug contact expediently has a recess in which the mating contact engages and/or with which the mating contact latches. This allows comparatively simple mechanical coupling of the plug contact to the mating contact, said coupling additionally being comparatively cost-effective to produce. On account of the recess and the engagement of the mating contact in said recess, the plug contact follows the movements of the mating contact.

The recess is particularly preferably designed in the manner of a blind hole. Therefore, the plug contact is comparatively stable and the structure of the plug contact is subjected to only comparatively low loading on account of the recess. In particular, the plug contact has two recesses which are arranged on the opposite sides of said plug contact. In this case, the plug contact is advantageously in the form of a blade contact and the mating contact is advantageously in the form of a forked contact. The limbs of the forked contact have structures, for example pins, which correspond to the recesses and are arranged in the respective recesses. It would also be feasible for the two recesses to be connected in the manner of a hole, that is to say for there to be only one single recess within the plug contact.

The plug contact can have a groove which runs perpendicular to the plug-contact-making direction. The groove is located away from the mating contact and, in particular, substantially in the center of the plug contact. A bending point which is expediently spring-elastic is formed with the aid of the structural weakened point in the plug contact in the region of the groove at said weakened point. In addition to the movement of the mating contact along the plug-contact direction, movements of the mating contact perpendicular to the plug-contact direction are compensated for in this way, while those of the plug contact remain in secure electrical contact with the mating contact. The plug contact particularly preferably comprises two grooves of this kind, said grooves being inserted into the plug contact in particular on mutually opposite sides of said plug contact. By way of example, only one single bending point is formed by means of the two grooves in this case.

The electric motor is suitably rigidly connected to the electronics system housing. In other words, possible movements between the electronics system housing and the electric motor are limited to micro movements. The extent of movements of this kind is usually less than 0.5 mm. On account of the ability of the plug contact to move, movements of the two contacts relative to one another are prevented in this case. Only the plug contact is moved slightly in comparison to further components of the electric motor. Since, however, in particular the electrical connection between the brush and the associated plug contact is flexible, a movement of this kind does not lead to any corrosion phenomena or further damage. The electric motor is expediently screwed to the electronics system housing. This allows the electric motor to be mounted on or released from the housing in a comparatively time-saving and cost-efficient manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

Parts which correspond to one another are provided with the same reference symbols in all the figures.

DETAILED DESCRIPTION

Figure 1:
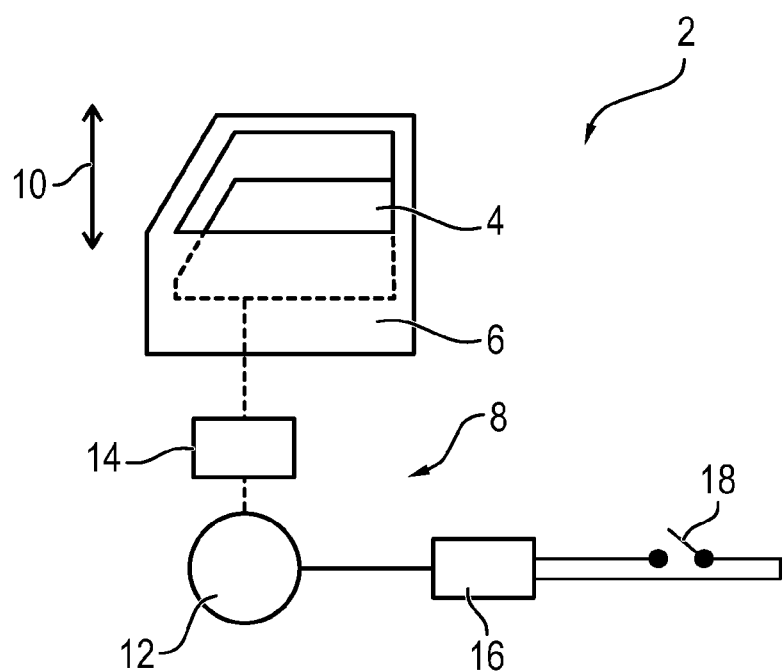
FIG. 1 schematically shows an adjustment drive.

FIG. 1 schematically illustrates an electric window winder 2 having a window pane 4, which window winder is integrated in a door 6 of a motor vehicle. The window pane 4 is moved along an adjustment path 10 by means of an adjustment drive 8. The adjustment drive 8 comprises an electric motor 12 which has an associated worm gear mechanism 14 on the shaft side, the rotary movement of the electric motor 12 being converted into a translatory movement of the window pane 4 by means of said worm gear mechanism. The electric motor 12 is supplied with electrical energy by a control electronics system 16 as soon as an occupant of the motor vehicle starts an adjustment movement of the window pane 4 along the adjustment path 10 by means of operating a button 18. A trapping prevention device is integrated in the control electronics system 16, said trapping prevention device preventing an object which is located in the adjustment path 10 becoming trapped by the window pane 4.

Figure 2:
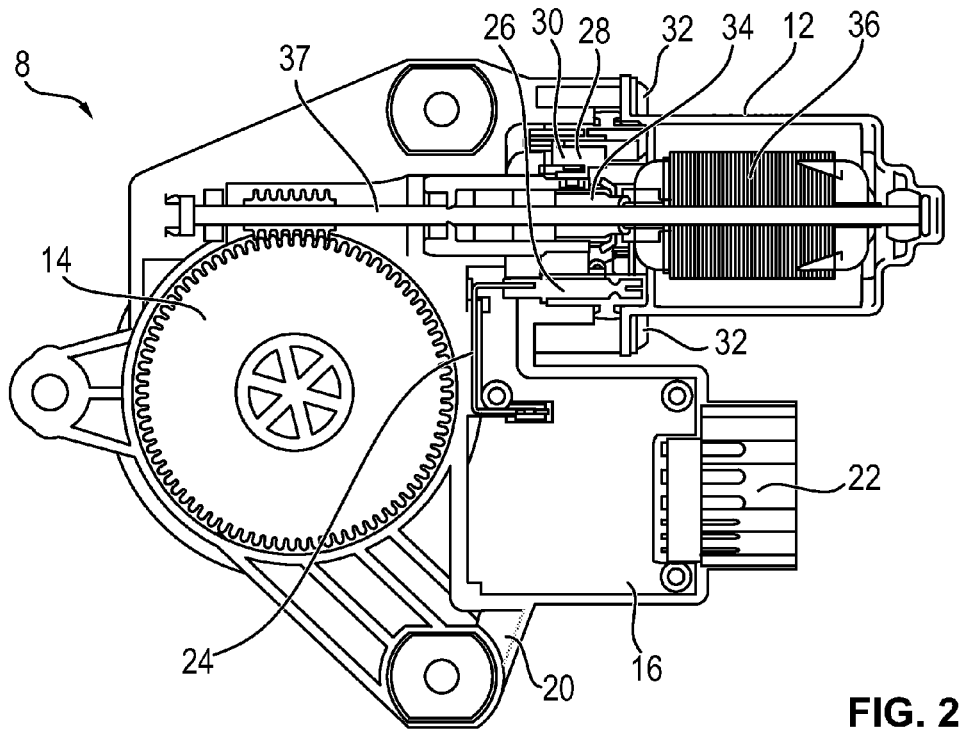
FIG. 2 shows the adjustment drive in a sectional illustration from above.

FIG. 2 shows a sectional illustration of the adjustment drive 8, wherein the control electronics system 16 is arranged within an electronics system and gear mechanism housing 20. The control electronics system 16 can be coupled to an on-board electrical system of the motor vehicle and to a power supply by means of a supply plug 22. The control electronics system 16 makes electrical contact with two mating contacts 24 which are produced from a resilient electrically conductive metal, only one of said mating contacts being shown in the figure. The mating contacts 24 are located within a hollow space in the electronics system housing 20. Each mating contact 24 makes electrical contact with a plug contact 26 of the electric motor 12, said plug contact being a constituent part of a brush system 28 of the electric motor 12. The brush system 28 has a main body 30 which is composed of plastic and is fitted with the plug contacts 26 and the other constituent parts of the brush system 28. The brush system 28 is located on an end side of the electric motor 12 and is placed in an interlocking manner into a recess which is formed by the electronics system housing 20 and further constituent parts of the electric motor 12. The electric motor 12, in turn, is connected to the electronics system housing 20 by means of two screws 32, and therefore the brush system 28 is fixed in the recess in an interlocking and force-fitting manner.

The brush system 28 also comprises brushes which are electronically connected both to the plug contacts 26 and to a commutator 34 of the rotor 36 of the electric motor 12. The rotor 36 has a shaft 38 which is routed through the brush system 28 and is mechanically operatively connected to the worm gear mechanism 14 which is arranged within the electronics system housing 20.

Figure 3:
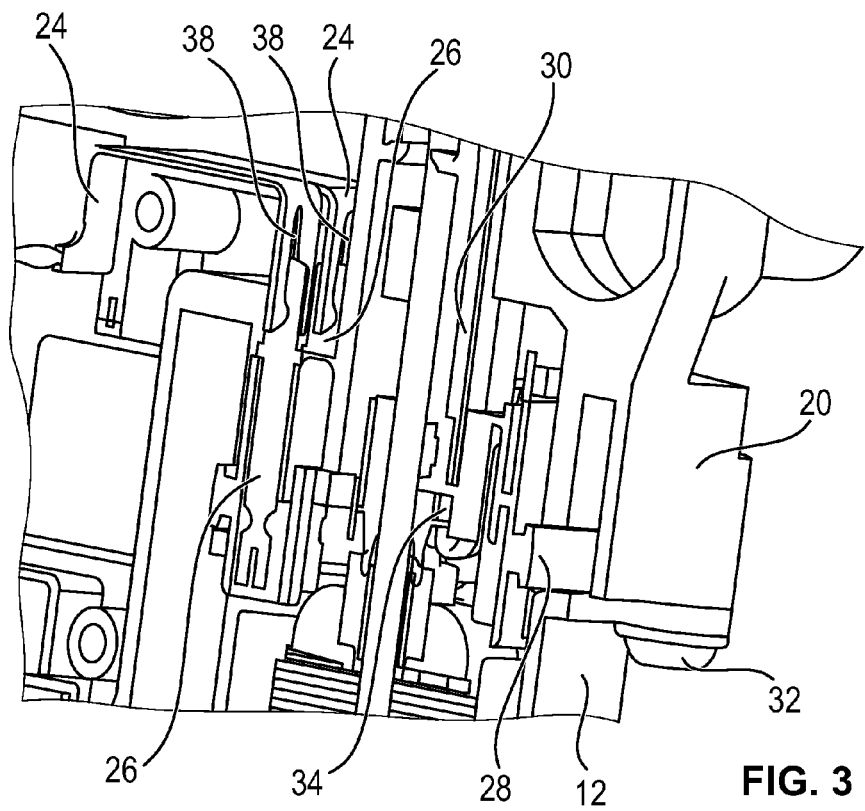
FIG. 3 shows a perspective view of a detail of the adjustment drive.

FIG. 3 shows an enlarged and perspective sectional illustration of the brush system 28 and the mating contacts 24. The mating contacts 24 run substantially parallel to one another and are essentially metal strips which are bent into a U shape in order to form a forked contact.

Each mating contact 24 is cut at the free end which is in electrical and mechanical contact with the plug contact 26. To this end, this U-limb has a slot 38 over its entire length, said slot tapering from the free end in the direction of the bent point which at least partially forms the U-shape. The two free ends 30 of the slot 38 are of thickened design. The plug contact 26, which is designed as a blade contact, is arranged between the forked contact which is formed in this way and is held there in a force-fitting and interlocking manner. In this case, the orientation of the plug contact 26 is oriented substantially perpendicular to the orientation of the slotted free end of the associated mating contact 24 in the assembled state.

Figure 4A:
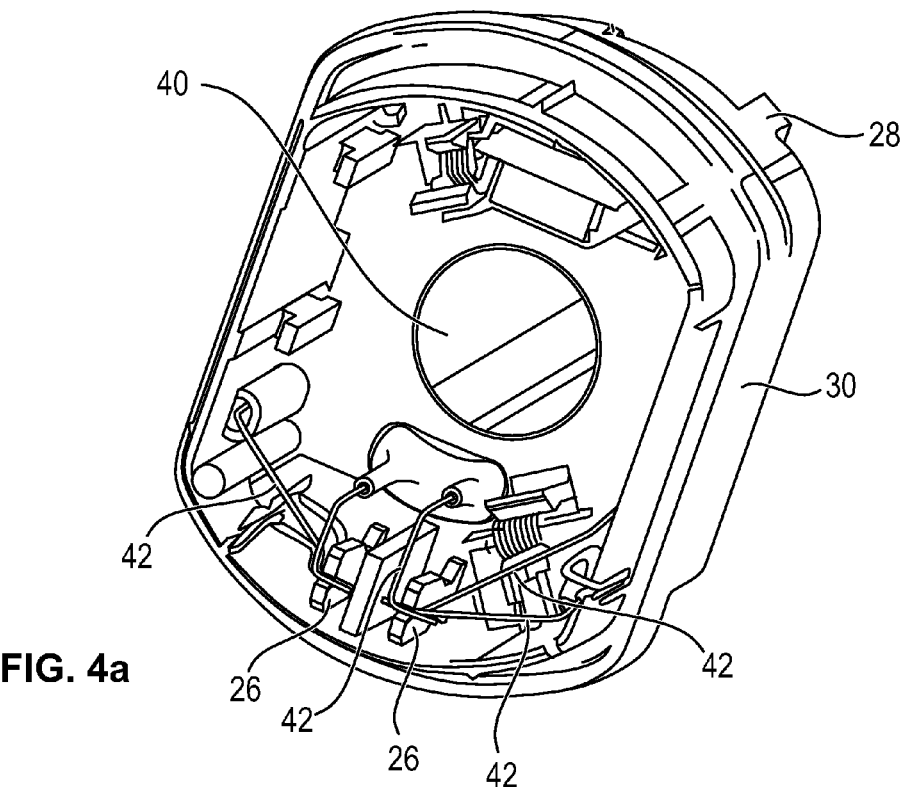
FIGS. 4a, 4b show perspective views of a brush system of the adjustment drive.
Figure 4B:
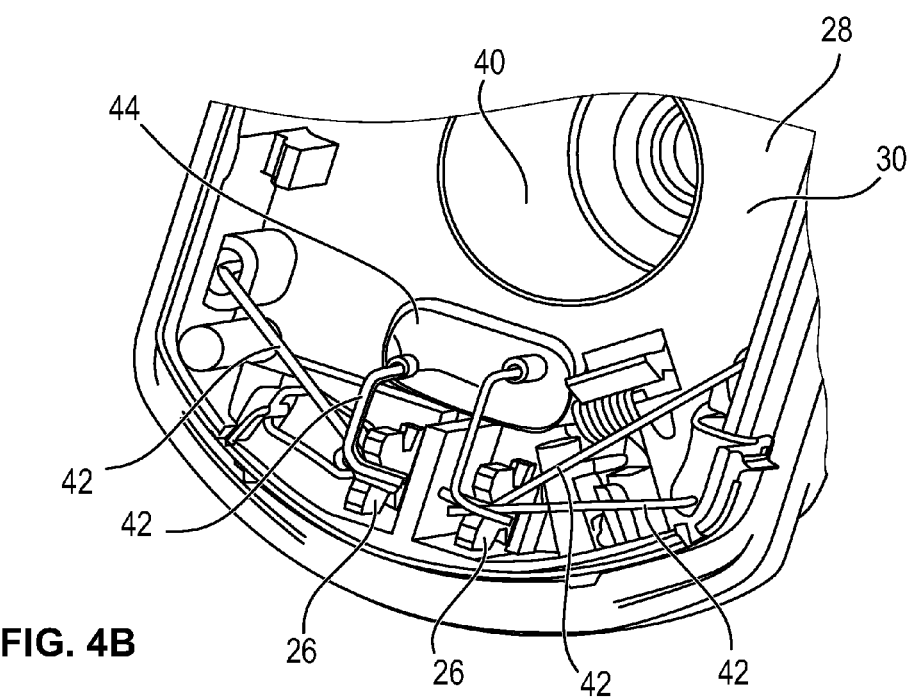

The main body 30, which is produced from a plastic, of the brush system 28 is shown in a perspective view in FIG. 4a and as a detail on an enlarged scale in FIG. 4b. The viewing direction is from that side of the brush system 28 which is averted from the electronics system housing 20 in each case. In other words, that part of the brush system 28 which faces the rotor 36 is shown. The main body 30 has, in the center, a hollow-cylindrical projection 40 within which the commutator 34 is located in the assembled state.

Figure 5:
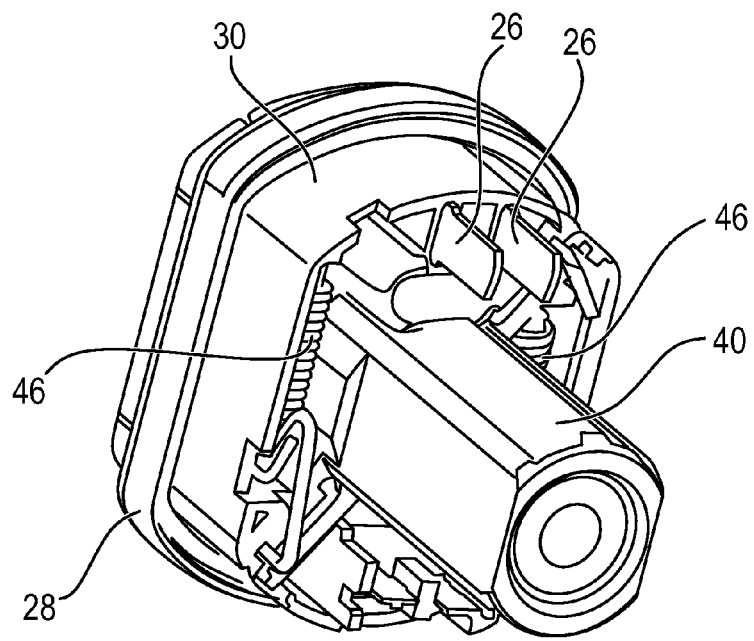
FIG. 5 shows the brush system from another perspective.

The two plug contacts 26 which project through the main body 30 and are oriented substantially parallel to one another are located in the edge region of the main body 30. In order to prevent a fault arc between the two plug contacts 26, a tongue which is integrally formed on the main body 30 and is composed of electrically insulating material is located there. That end of each plug contact 26 which is averted from the mating contact 24 has an insulation-displacement termination 41 into which a number of connection wires 42 are inserted. Some of the connection wires 42 lead to a temperature monitor 44 by means of which the electric motor 12 is short-circuited in the event of overloading. Further connection wires 42 lead to a throttle 46—shown in FIG. 5—which is arranged on that side of the main body 30 which is situated opposite the insulation-displacement termination 41. To this end, the respective connection wire 42 is routed though the main body 30. The throttles 46 are used to reduce electrical interference signals which are created during operation of the electric motor 12 on account of the brushes—not shown here—which are electrically connected to the commutator 34.

Figure 6A:
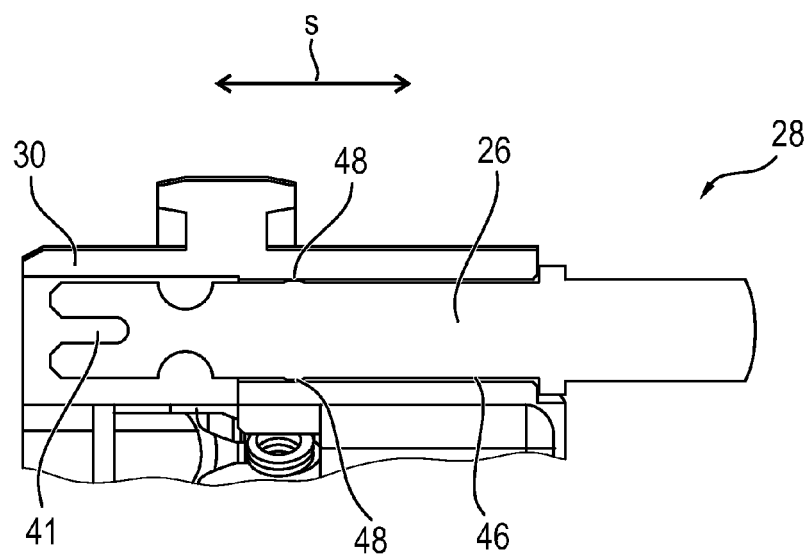
FIGS. 6a-6c show a first embodiment of a plug contact of the adjustment drive.
Figure 6B:
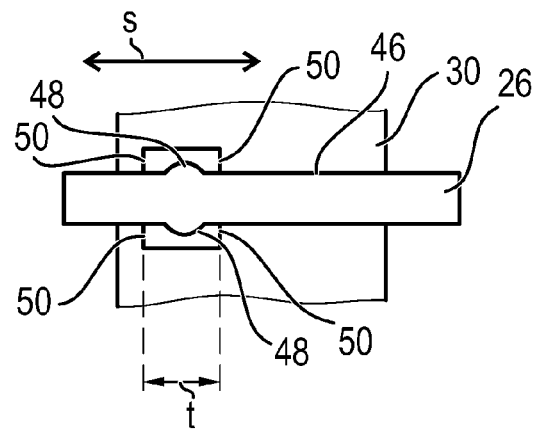
Figure 6C:
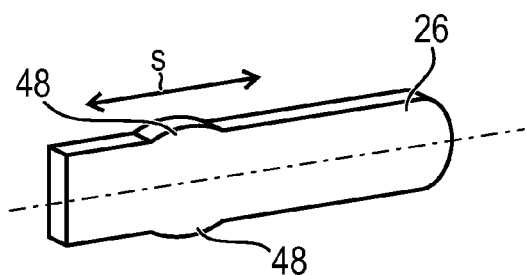

FIG. 6a shows a detailed sectional illustration of the plug contact 26 along the plug-contact-making direction s, and FIGS. 6b and 6c schematically show a simplified view of said plug contact. In this case, the plug-contact-making direction s is the direction in which the plug contact 26 has to be moved in order to engage with the mating contact 24 which is designed as a forked contact. The plug-contact-making direction s is therefore substantially along the direction of extent of the shaft 37 in this example.

The strip-like plug contact 26 is arranged such that it can move within a contour 46. The contour 46 is a channel which is made in the main body 30 of the brush system 28. The channel extends substantially in the plug-contact-making direction s, and the plug contact 26 projects beyond the contour 46 on both sides in the plug-contact-making direction s, that is to say projects out of the channel on both sides. The channel rests against the strip-like plug contact 26 on the two opposite main side faces of said plug contact which are parallel to the sectional plane in FIG. 6a. Two stop elements 48 are fitted to the two further opposite sides of the plug contact 26 which run substantially parallel to the plug-contact-making direction s. The lug-like stop elements 48 are integrally arranged with the plug contact 26 and substantially perpendicular to the plug-contact-making direction s. The positions of the stop elements 48 are at the same distance from the same free end of the plug contact 26. Each stop element 48 has two associated limiting faces 50 of the contour 46 which limit a movement distance t of the plug contact 26. If the plug contact 26 is moved along the plug-contact-making direction s within the contour 46, the stop elements 48 stop against the stop faces 50 if the plug contact 26 was moved over the complete movement distance t. The movement distance t is less than 1 mm.

If the drive 8 is shaken during operation, as is caused, for example, on account of the rotary movement of the rotor 36, the plug contact 26 follows the movements of the mating contact 24 in the plug-contact-making direction s. Therefore, there are no micro movements between said plug contact and mating contact and contact corrosion between said plug contact and mating contact is prevented. Similarly, no contact corrosion occurs at the electrical connection between the throttle 46 and the temperature monitor 44 and the respective plug contact 26 since the respective connection cable 42 is of flexible design.

Figure 7A:
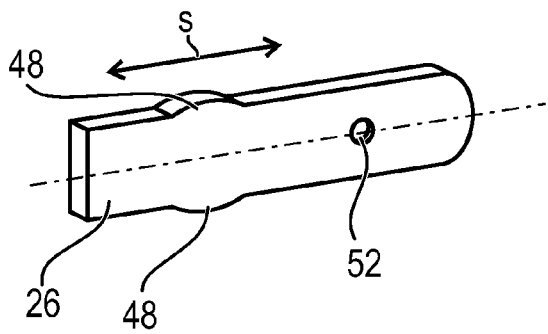
FIGS. 7a, 7b show a second embodiment of the plug contact.
Figure 7B:
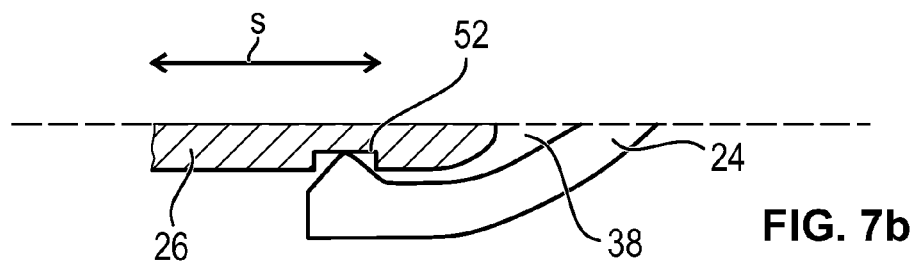

FIGS. 7a and 7b show a simplified perspective view of an alternative embodiment of the plug contact 26 and, respectively, a plan view of a detail of said plug contact. Neither diagram shows an insulation-displacement terminal contact component 41, but this can be located at the free end of the plug contact 26 which is situated opposite the free end with which the mating contact 24 engages. The plug contact 26—shown here—has a recess 52 which is made in one of the side faces of the plug contact 26, wherein the opposite side face likewise has a recess 52 of this kind. The recesses 52 are located offset in the direction of the free end of the plug contact 26 where the mating contact 24 is located. The recesses 52 are designed in the form of a blind hole and congruent to one another. In other words, the two recesses 52 would produce a single hole if at least one of the recesses 52 were sufficiently recessed. The mating contact 24 which is designed as a forked contact engages in the recesses 52 in the assembled state by way of its thickened portions at the free end. In this way, the plug contact 26 is pulled or pushed by the mating contact 24 during the vibrations in the plug-contact-making direction s.

Figure 8:
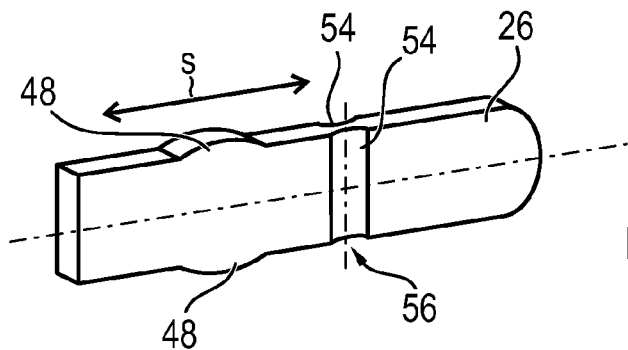
FIG. 8 shows a third embodiment of the plug contact.

FIG. 8 shows a further embodiment of the plug contact 26. Instead of the recess 52, a groove 54 is made in each of the side faces of the plug contact 26, said groove being located between the stop elements 48 and the free end which faces the mating contact 24. The profile of each of the grooves 54 is perpendicular to the plug-contact-making direction s and substantially congruent. Therefore, each of the grooves 54 is at the same distance from the same free end of the plug contact 26. The two grooves 54 form a bending point 56 around which that free end of the plug contact 26 which engages with the forked contact 24 can be elastically deformed in relation to the opposite free end. In other words, when the free end moves about the bending point 56, a restoring force acts on said free end. In this way, micro movements of the mating contact 24 are also compensated for, these micro movements being performed perpendicular to the plug-contact-making direction s without the mating contact 24 being moved along the plug contact 26, that is to say the electrical and mechanical contact between said mating contact and plug contact would shift.

Figure 9A:
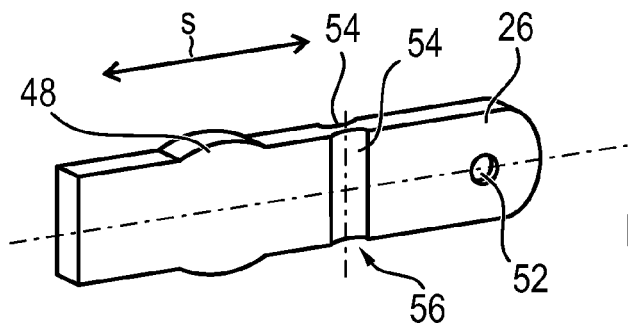
FIGS. 9a, 9b show a fourth embodiment of the plug contact.
Figure 9B:
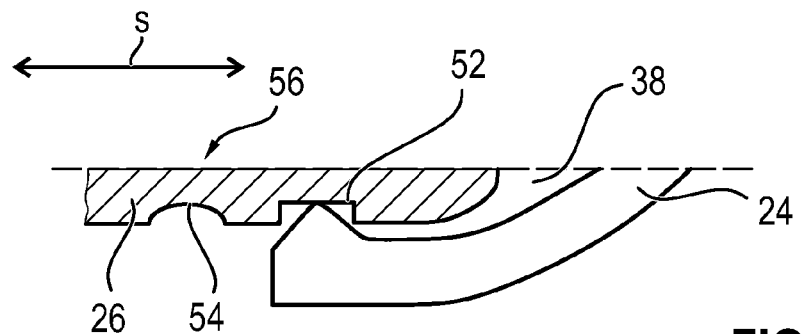

A further embodiment of the plug contact 26 is illustrated in FIG. 9a and FIG. 9b in accordance with FIGS. 7a and 7b. The plug contact 26 has both the recesses 52 and the grooves 54 for forming the bending point 56. In this case, the grooves 54 are located between the recesses 52 and the stop elements 48. In this embodiment, both micro movements of the mating contact 24 along and perpendicular to the plug-contact-making direction s are taken into consideration, wherein the mechanical and therefore also the electrical contact between the mating contact 24 and the plug contact 26 is established by means of the recesses 52 in a comparatively reliable manner.

The invention is not restricted to the above-described exemplary embodiments. Rather, other variants of the invention can be derived therefrom by a person skilled in the art without departing from the subject matter of the invention. In particular, all of the individual features which are described in connection with the exemplary embodiment can be combined with one another in some other way without departing from the subject matter of the invention.

What is claimed is:

1. An adjustment drive comprising:
an electric motor;
a brush system that is connectable to a plug contact in order to supply power to the electric motor; and
an electronics system housing in which a mating contact, with which the plug contact makes contact, is arranged,
wherein the plug contact is slidably mounted in the brush system such that the plug contact is movable in a plug-contact-making direction, where the plug-contact-making direction is a direction the plug contact is moved to establish an electrical connection with the mating contact, and
wherein the plug contact is routed within a main body of the brush system in a contour that extends in the plug-contact-making direction.

2. The adjustment drive as claimed in claim 1, having an interlocking and/or force-fitting plug connection between the plug contact and the mating contact.

3. The adjustment drive as claimed in claim 1, wherein the plug contact is pliant or flexible perpendicular to the plug-contact-making direction.

4. The adjustment drive as claimed in claim 1, wherein the plug contact has at least one stop element for limiting a movement distance.

5. The adjustment drive as claimed in claim 4, wherein the movement distance of the plug contact is less than 1 mm.

6. The adjustment drive as claimed in claim 1, wherein the plug contact is a blade contact and the mating contact is a forked contact.

7. The adjustment drive as claimed in claim 1, wherein the plug contact has at least one blind-hole-like recess in which the mating contact engages.

8. The adjustment drive as claimed in claim 1, wherein the mating contact latches with the plug contact.

9. The adjustment drive as claimed in claim 1, wherein the plug contact has at least one groove that runs substantially perpendicular to the plug-contact-making direction in order to form a spring-elastic bending point.

10. The adjustment drive as claimed in claim 1, wherein the electric motor is rigidly connected to the electronics system housing.

11. The adjustment drive as claimed in claim 1, wherein the plug contact has at least one blind-hole-like recess in which the mating contact is engageable and the plug contact has at least one groove that runs substantially perpendicular to the plug-contact-making direction to form a spring elastic bending point.

12. The adjustment drive as claimed in claim 1, wherein one end of the plug contact is forked.

13. An adjustment drive comprising:
an electric motor;
a brush system that is connectable to a plug contact in order to supply power to the electric motor; and
an electronics system housing in which a mating contact, with which the plug contact makes contact, is arranged,
wherein the plug contact is slidably mounted in the brush system such that the plug contact is movable in a plug-contact-making direction, where the plug-contact-making direction is a direction the plug contact is moved to establish an electrical connection with the mating contact.

* * * * *